(12) United States Patent  
Kawahara (10) Patent No.: US 10,174,823 B2  
(45) Date of Patent: Jan. 8, 2019

(54) VIBRATION REDUCTION DEVICE (71) Applicant: EXEDY Corporation, Neyagawa-shi, Osaka (JP)

(72) Inventor: Yuki Kawahara, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 59 days.

(21) Appl. No.: 15/434,710

(22) Filed: Feb. 16, 2017

(65) Prior Publication Data

US 2017/0268648 A1   Sep. 21, 2017

(30) Foreign Application Priority Data

Mar. 18, 2016   (JP) ................................. 2016-055064

(51) Int. Cl.
| F16H 45/02 | (2006.01) |
| F16F 15/123 | (2006.01) |
| F16F 15/14 | (2006.01) |
| F16D 13/52 | (2006.01) |
| F16D 13/12 | (2006.01) |
| F16D 25/0638 | (2006.01) |

(52) U.S. Cl.
CPC ....... F16H 45/02 (2013.01); F16F 15/12353 (2013.01); F16F 15/1428 (2013.01); *F16D 13/12* (2013.01); *F16D 13/52* (2013.01); *F16D 25/0638* (2013.01); *F16D 2300/22* (2013.01); *F16H 2045/0221* (2013.01); *F16H 2045/0263* (2013.01); *F16H 2045/0284* (2013.01)

(58) Field of Classification Search
CPC ............ F16H 45/02; F16H 2045/0284; F16H 2045/0221; F16F 15/12353; F16D 13/52; F16D 2300/22

See application file for complete search history.

(56) References Cited

U.S. PATENT DOCUMENTS

| 9,784,352 | B2* | 10/2017 | Tomiyama | .............. F16H 45/02 |
| 2010/0242466 | A1* | 9/2010 | Krause | .................. F16F 15/145 60/327 |
| 2011/0192692 | A1* | 8/2011 | Werner | ............. F16F 15/12353 192/3.29 |
| 2013/0206529 | A1* | 8/2013 | Tomiyama | .............. F16H 45/02 192/3.28 |
| 2014/0345997 | A1* | 11/2014 | Gerdeman | .............. F16D 33/18 192/3.28 |
| 2017/0138435 | A1* | 5/2017 | Inoue | .................... F16F 15/134 |

FOREIGN PATENT DOCUMENTS

JP   2015212568 A   11/2015

* cited by examiner

*Primary Examiner* — David J Hlavka  
(74) *Attorney, Agent, or Firm* — United IP Counselors, LLC (57) ABSTRACT

A lock-up device includes a damper portion and a dynamic damper device. The damper portion damps vibration inputted from a front cover. The damper portion includes a driven plate coupled to a turbine shell of a torque converter body on a radially outside side. The dynamic damper device absorbs vibration transmitted from the driven plate to the turbine shell. The dynamic damper device includes at least one damper plate portion. The damper plate portion is coupled to the turbine shell on a radially outside side.

11 Claims, 10 Drawing Sheets

VIBRATION REDUCTION DEVICE

CROSS-REFERENCE TO RELATED APPLICATIONS

This application claims priority to Japanese Patent Application No. 2016-055064 filed on Mar. 18, 2016, the entirety of which is hereby incorporated by reference in its entirety.

BACKGROUND

Technical Field

The present disclosure relates to a vibration reduction device, particularly to a vibration reduction device being disposed between a front cover coupled to an engine-side member and a torque converter body and configured to reduce vibration transmitted from the front cover to the torque converter body.

Background Information

In the conventional vibration reduction device, for example, a rock-up device (Japan Laid-open Patent Application Publication No. 2015-212568), a output flange (a first output portion) of a damper mechanism (a damper portion) is fixed to a turbine hub (a output side member) on a radially inside. A damper plate (a second output portion) of a dynamic damper device (a dynamic vibration absorbing device) is fixed to the output flange on a radially outside.

In the conventional rock-up device, the output flange of the damper mechanism and the damper plate of the dynamic damper device are respectively fixed to the above members on the radially inside and outside. Thus, there was possibility that the vibration reduction device increases in size.

It is an object of the present disclosure to provide a vibration reduction device capable of reducing in the size thereof in an axial direction.

BRIEF SUMMARY (1) A vibration reduction device according to an aspect of the present disclosure is disposed between a front cover coupled to an engine-side member and a torque converter body. The vibration reduction device is configured to reduce a vibration transmitted from the front cover to the torque converter body.

The vibration reduction device includes a damper portion and a dynamic vibration absorbing device. The damper portion is configured to damp vibration inputted from the front cover. The damper portion includes a first output portion couple to a output side member of the torque converter body on a radially outside. The dynamic vibration absorbing device is configured to absorb vibration transmitted from the first output portion to the output side member. The dynamic vibration absorbing device includes a second output portion and an inertia portion. The second output portion is couple to the output side member on a radially outside. The inertia portion is relatively movable with respect to the second output portion.

In the vibration reduction device, the first output portion and the second output portion are coupled to the output side member of the torque converter body on a radially outside. Herewith, the vibration reduction device is capable of reducing in the size thereof in an axial direction, because there was no need of preparing space for coupling the second output portion to the output side member of the torque converter body on a radially inside in the axial direction such as the conventional vibration reduction device.

(2) A vibration reduction device according to another aspect of the present disclosure is preferably configured so that the first output portion is fixed to the output side member.

In this case, the vibration reduction device is capable of reliably transmitting power of the damper portion to the output side member of the torque converter body.

(3) A vibration reduction device according to another aspect of the present disclosure is preferably configured so that the second output portion is fixed to the output side member.

In this case, the vibration reduction device is capable of reliably reducing vibration, which is transmitted from the damper portion to the output side member of the torque converter body, with the dynamic vibration absorbing device.

(4) A vibration reduction device according to another aspect of the present disclosure is preferably configured so that the first output portion and the second output portion are formed integrally with each other.

In this case, the vibration reduction device is capable of reducing vibration, which is outputted from the first output portion to the output side member of the torque converter body, with the dynamic vibration absorbing device. Also, the vibration reduction device is capable of reducing the number of parts thereof, because the first and second output portions are formed as a unitary member.

(5) A vibration reduction device according to another aspect of the present disclosure is preferably configured so that the first output portion is formed separately from the second output portion.

In this case, the vibration reduction device is capable of reducing vibration, which is outputted from the first output portion to the output side member of the torque converter body, with the dynamic vibration absorbing device.

(6) A vibration reduction device according to another aspect of the present disclosure is preferably configured so that the first output portion and the second output portion is arranged in a circumferential direction.

In this case, the vibration reduction device is capable of effectively reducing vibration generated in the circumferential direction, which is outputted from the first output portion to the output side member of the torque converter body, with the dynamic vibration absorbing device.

(7) A vibration reduction device according to another aspect of the present disclosure is preferably configured so that the inertia portion of the dynamic vibration absorbing device is disposed on an outer side than the output side member in a radial direction.

In this case, the vibration reduction device is capable of reducing in the size thereof in an axial direction.

(8) A vibration reduction device according to another aspect of the present disclosure is preferably configured so that the damper portion includes a first elastic portion and a second elastic portion. The second elastic portion is disposed on an outer side than the first elastic portion in a radial direction and arranged in series with the first elastic portion. The first output portion is engaged with the second elastic portion and is coupled to the output side member.

In this case, power of the engine is transmitted from the first elastic portion on the radially inside to the second elastic portion on the radially outside. And the power is transmitted from the first output portion engaged with the second elastic portion to the output side member of the torque converter body. Thus, the vibration reduction device is capable of simply forming a configuration thereof and a power transmission route thereof.

(9) A vibration reduction device according to another aspect of the present disclosure further includes a clutch portion. The second elastic portion is disposed on an outer side than the clutch portion in a radial direction.

The vibration reduction device is capable of reducing in the size thereof in an axial direction, even if the vibration reduction device is configured as described above.

(10) A vibration reduction device according to another aspect of the present disclosure further includes a clutch portion. The clutch portion is a multi disc clutch.

In this case, the vibration reduction device is capable of reliably transmitting the power of the engine to the damper portion.

(11) A vibration reduction device according to another aspect of the present disclosure is preferably configured so that the dynamic vibration absorbing device includes the second output portion, the inertia portion, and a third elastic portion. The second output portion is integrally rotatable with the first output portion. The inertia portion is relatively rotatable with respect to the second output portion. The third elastic portion elastically couples the second output portion and the inertia portion.

In this case, the vibration reduction device is capable of effectively reducing rotational vibration within a predetermined range, which is transmitted from the first output portion to the output side member of the torque converter body.

Effect of the Present Disclosure

In the present disclosure, the vibration reduction device is capable of reducing in the size thereof in an axial direction.

BRIEF DESCRIPTION OF THE DRAWINGS

Referring now to the attached drawings, which form a part of this original disclosure.

DETAILED DESCRIPTION OF PREFERRED EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

Embodiment

Figure 1:
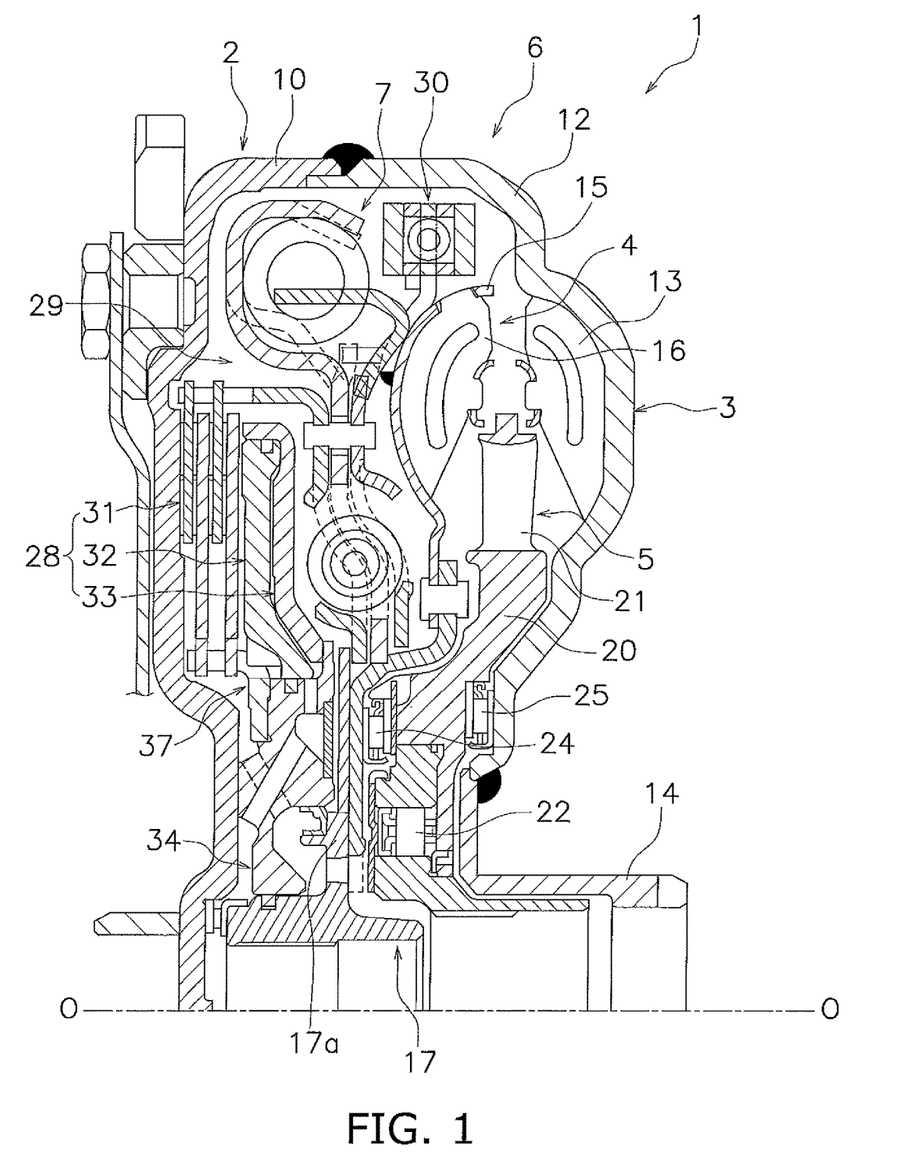
FIG. 1 is a partial cross sectional view of a torque converter including a rock-up device according to an embodiment of the present disclosure.

FIG. 1 is a partial cross sectional view of a torque converter 1 equipped with a lock-up device 7 (an example of a vibration reduction device) according to an exemplary embodiment of the present disclosure. In FIG. 1, an engine (not shown in the drawing) is disposed on the left side, whereas a transmission (not shown in the drawing) is disposed on the right side.

It should be noted that a line O-O depicted in FIG. 1 indicates a rotational axis of the torque converter and the lock-up device. A direction away from the rotational axis O is described as a radial direction. A direction around the rotational axis O is described as a circumferential direction or a rotational direction. A direction along the rotational axis O is described as a circumferential direction or an axial direction.

[Configuration of a Torque Converter]

The torque converter 1 is a device for transmitting a torque from an engine-side crankshaft (not shown in the drawings) to an input shaft of the transmission. As shown in FIG. 1, the torque converter 1 includes a front cover 2, a torque converter body 6, and a lock-up device 7.

The front cover 2 is fixed to an input-side member. The front cover 2 is a disc-shaped member, and an outer peripheral tubular part 10 is formed on the outer peripheral part of the front cover 2 so as to protrude toward the transmission.

The torque converter body 6 includes three types of vane wheels, for example, an impeller 3, a turbine 4 and a stator 5.

The impeller 3 includes an impeller shell 12 fixed to the outer peripheral tubular part 10 of the front cover 2 by welding, a plurality of impeller blades 13 fixed to the inside of the impeller shell 12, and a tubular impeller hub 14 disposed on the inner peripheral side of the impeller shell 12.

The turbine 4 is disposed within a fluid chamber so as to be opposed to the impeller 3. The turbine 4 includes a turbine shell 15 (an example of an output side member), a plurality of turbine blades 16 fixed to the turbine shell 15, and a turbine hub 17 fixed to the inner peripheral part of the turbine shell 15.

The turbine hub 17 has a flange 17a extending to the outer side in the radial direction. The inner peripheral part of the turbine shell 15 is fixed to the flange 17a by a plurality of rivets 18. Furthermore, the input shaft of the transmission (not shown) is spline-coupled to the inner peripheral part of the turbine hub 17.

The stator 5 is configured to regulate the flow of operating oil returning from the turbine 4 to the impeller 3, and is disposed between the inner peripheral part of the impeller 3 and that of the turbine 4. The stator 5 mainly includes a stator carrier 20 and a plurality of stator blades 21 mounted to the outer peripheral surface of the stator carrier 20. The stator carrier 20 is supported by a stationary shaft (not shown) through a one-way clutch 22. It should be noted that thrust bearings 24 and 25 are mounted on the both sides of the stator carrier 20 in the axial direction.

[Lock-Up Device]

Figure 2:
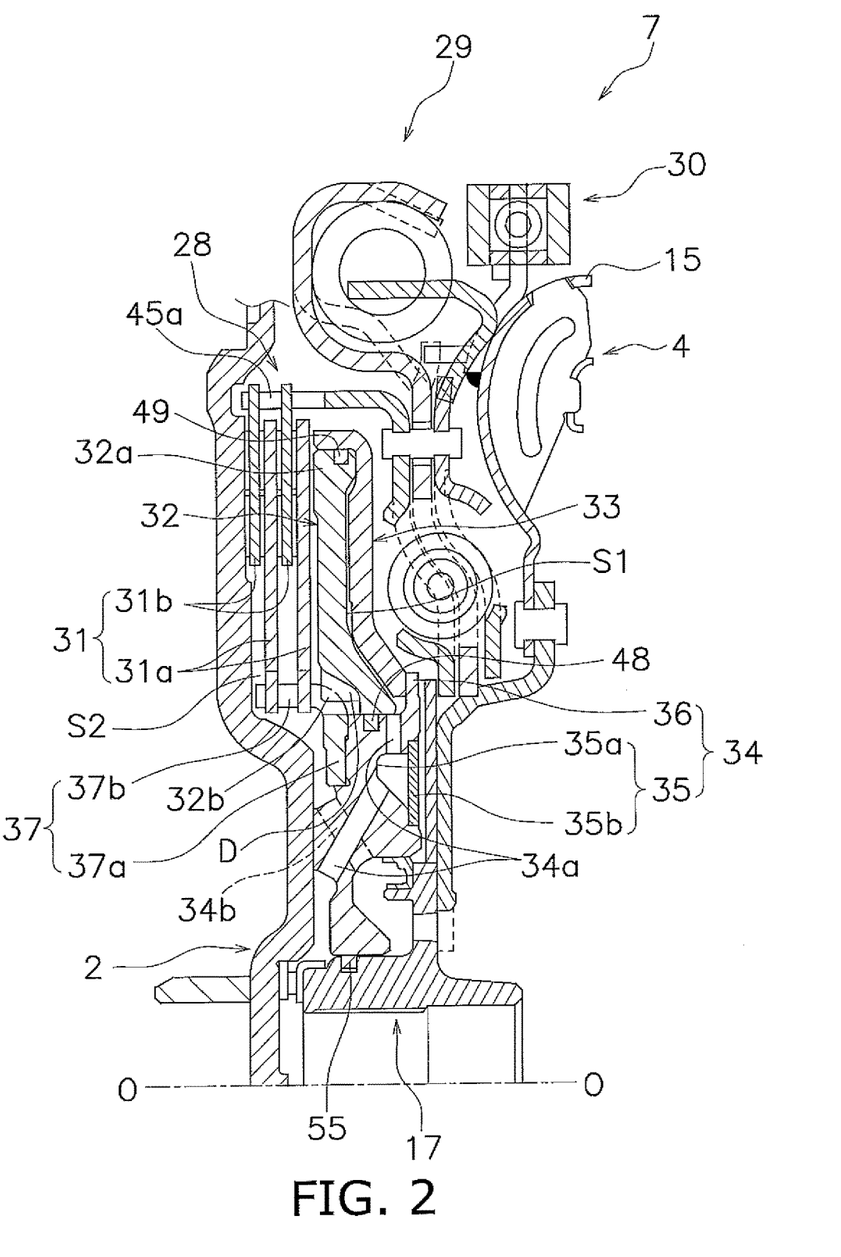
FIG. 2 is a view extracted a rock-up device from the torque converter of FIG. 1.

As shown in FIGS. 1 and 2, the lock-up device 7 is disposed in a space produced between the front cover 2 and the turbine 4. The lock-up device 7 includes a clutch portion 28, a damper portion 29, and a dynamic damper device 30 (an example of a dynamic vibration absorbing device).

<Clutch Portion>

As shown in FIGS. 1 and 2, the clutch portion 28 is a multi disc clutch. The clutch portion 28 includes a plurality of clutch plates 31, a piston 32, a hydraulic chamber forming member 33.

—Clutch Plate—

The plurality of clutch plates 31 are disposed between the front cover 2 and the piston 32. The plural clutch plates 31 includes two first clutch plates 31a and two second clutch plates 31b. Both of the first clutch plates 31a and the second clutch plates 31b have annular shapes, and are disposed so as to be alternately aligned in the axial direction. Each first clutch plate 31a has a plurality of teeth on the inner peripheral part thereof. Each second clutch plate 31b has friction facings fixed to the both faces thereof. Each second clutch plate 31b has a plurality of teeth on the outer peripheral part thereof.

—Piston—

The piston 32 has an annular shape, and is disposed on the transmission side of the front cover 2. The piston 32 is supported on a clutch boss 34. Specifically, an inner peripheral surface of the piston 32 is supported on an outer peripheral surface of the clutch boss 34 so as to the piston 32 is movable with respect to the clutch boss 34 in the axial direction. The clutch boss 34 is fixed to the inner peripheral part of the front cover 2.

The piston 32 includes a pressing portion 32a and a plurality of engagement projections 32b. The pressing portion 32a is configured to press the plurality of plural clutch plates 31 toward the front cover 2. The pressing portion 32a is provided on the outer side of the piston 32 so as to be opposed to the plurality of plural clutch plates 31 in the axial direction. Each of the plurality of engagement projections 32b engages with the each of a plurality of projecting portions 37b of a plate supporting portion 37 (as described below). Each of the plurality of engagement projections 32b is formed at predetermined intervals in the circumferential direction.

The clutch boss 34 has an oil reservoir portion 35 and a flange portion 36. The oil reservoir portion 35 includes an annular groove portion 35a and a annular plate portion 35b. The annular groove portion 35a is formed in an annular shape and extends in the circumferential direction. The annular plate portion 35b seals an opening of the annular groove portion 35a. The flange portion 36 is configured to support the hydraulic chamber forming member 33. The flange portion 36 is formed in an annular shape and protrudes from an outer peripheral portion of the clutch boss 34 to the outer side in the radial direction.

Also, the plate supporting portion 37, which supports the first clutch plate 31a, is fixed to the clutch boss 34. The plate supporting portion 37 includes substantially annular supporting body 37a and the plurality of projecting portions 37b.

The supporting body 37a is fixed to the clutch boss 34. The plurality of projecting portions 37b protrudes from the supporting body 37a toward the front cover 2. Each of the plurality of projecting portions 37b is formed at predetermined intervals in the circumferential direction. The plurality of projecting portions 37b respectively engages with teeth formed on the inner peripheral portion of the first clutch plate 31a. Thus, the first clutch plate 31a is non-rotatable and axially movable with respect to the plate supporting portion 37, that is, the clutch boss 34.

Each of the engagement projections 32b of piston 32 engages with each of projecting portions 37b adjacent to each other in the circumferential direction. Thus, piston 32 is non-rotatable with respect to the plate supporting portion 37.

Also, a predetermined space D is provided between recess portion between the engagement projections 32b adjacent to each other in the circumferential direction, and an outer peripheral surface of the plate supporting portion 37 which is opposed to the recess portion. The piston 32 is movable with respect to the plate supporting portion 37 in the range of the predetermined space D.

—Hydraulic Chamber Forming Member—

The hydraulic chamber forming member 33 is disposed on the turbine side of the piston 32. The hydraulic chamber forming member 33 is fixed to the clutch boss 34. In the embodiment, an inner peripheral part of the hydraulic chamber forming member 33 is fixed to the flange portion 36 of the clutch boss 34.

Specifically, the inner peripheral part of the hydraulic chamber forming member 33 is fixed to the flange portion 36 of the clutch boss 34 by welding, in the state where the inner peripheral part of the hydraulic chamber forming member 38 abuts against the flange portion 36. An outer peripheral part of the hydraulic chamber forming member 33 is formed in a tubular shape and covers an outer peripheral part of the piston 32, for example, the pressing portion 32a.

—Oil Chamber—

In the construction as described above, a seal member 48, 49 are mounted between the inner peripheral surface of the piston 32 and the outer peripheral surface of the clutch boss 34, and between the outer peripheral surface of the piston 32 and the outer peripheral part (the tubular part) of the hydraulic chamber forming member 33. Thus, a first oil chamber S1 and a second oil chamber S2 is formed.

The operating oil is supplied in the first oil chamber S1 or discharged from the first oil chamber S1, via a first oil path 34a provided on the clutch boss 34. The operating oil is supplied in the second oil chamber S2 or discharged from the second oil chamber S2, via a second oil path 34b provided on the clutch boss 34. Specifically, the operating oil is supplied in the second oil chamber S2 or discharged from the second oil chamber S2, via the second oil path 34b and the oil reservoir portion 35. A seal member 55 is mounted between the inner peripheral surface of the clutch boss 34 and the outer peripheral surface of the turbine hub 17.

<Damper Portion>

Figure 3:
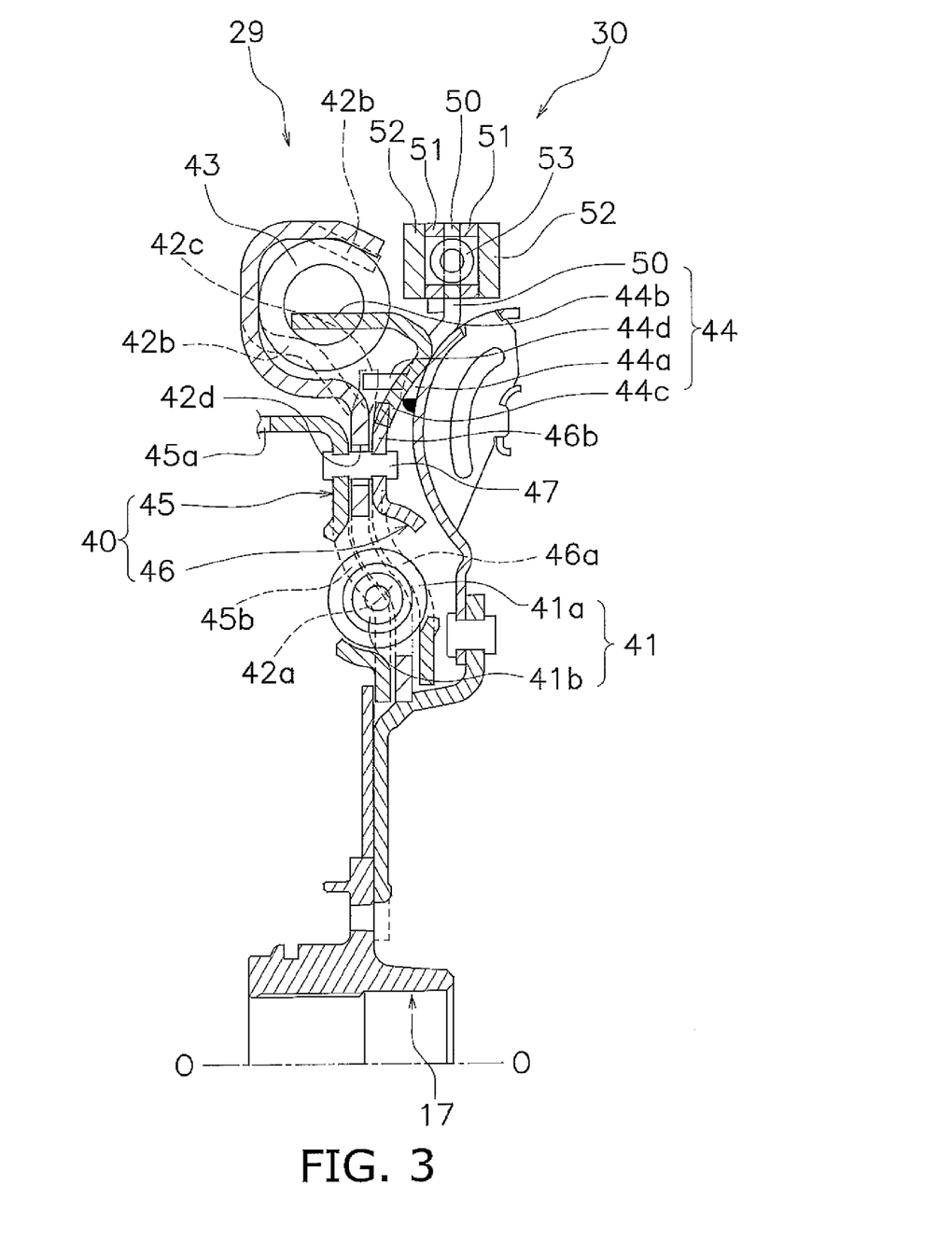
FIG. 3 is a view extracted a damper portion and a dynamic damper device from the torque converter of FIG. 1.

The damper portion 29 is configured to damp vibration inputted from the front cover 2. As shown in FIG. 3, the damper portion 29 includes a drive plate 40, inner peripheral side torsion springs 41 (an example of a first elastic portion), an intermediate plate 42, outer peripheral side torsion springs 43 (an example of a second elastic portion), and a driven plate 44 (an example of a first output portion).

—Drive Plate—

The drive plate 40 is disposed on the output side of the clutch portion 28. Specifically, the drive plate 40 includes a first drive plate 45 and a second drive plate 46.

The first drive plate 45 is disposed on an engine side. The first drive plate 45 includes a first clutch engagement portion 45a extending toward the front cover 2 and a plurality of first spring engaging portions 45b.

The first clutch engagement portion 45a is formed in a substantially tubular shape. A plurality of grooves extending in the axial direction are formed at predetermined intervals in the circumferential direction. The teeth formed on the outer peripheral portion of the second clutch plate 31b engage with the plurality of grooves. Thus, the second clutch plate 31b is non-rotatable and axially movable with respect to the drive plate 40.

Each of the plurality of first spring engaging portions 45b is formed on part extending from the turbine side of the first clutch engagement portion 45a to the radially inner side. Specifically, each of the plurality of first spring engaging portions 45b is a window portion which is arranged at predetermined intervals in the circumferential direction. A cut-raised part is formed by cutting and raising each of an inner peripheral portion and an outer peripheral portion of each of the first spring engaging portions 45b.

The inner peripheral side torsion springs 41 is disposed in each of the first spring engaging portions 45b. Also, a pair of wall portions, opposing to each other in the circumferential direction on each of the first spring engaging portions 45b, engage with each of both ends of the inner peripheral side torsion springs 41.

The second drive plate 46 is disposed on the transmission side. The second drive plate 46 is disposed at predetermined intervals with the first drive plate 45 in the axial direction. The second drive plate 46 is fixed to the first drive plate 45 by a fixing means, for example, a plurality of rivets 47.

The second drive plate 46 includes a plurality of second spring engaging portions 46a, a first rotation restricting portion 46b. Each of the plurality of second spring engaging portions 46a is a window portion which is arranged at predetermined intervals in the circumferential direction. Each of the second spring engaging portions 46a is disposed so as to be opposed to each of the first spring engaging portions 45b in the axial direction. A cut-raised part is formed by cutting and raising each of an inner peripheral portion and an outer peripheral portion of each of the second spring engaging portion 46a.

The inner peripheral side torsion springs 41 is disposed in each of the second spring engaging portions 46a. Also, a pair of wall portions, opposing to each other in the circumferential direction on each of the second spring engaging portions 46a, engage with each of both ends of the inner peripheral side torsion springs 41.

The first rotation restricting portion 46b is provided on the outer peripheral portion of the second drive plate 46 to restrict a rotation of the drive plate 40 (the first and second drive plate 45, 46) with respect to the driven plate 44. The first rotation restricting portion 46b is a paw portion which protrudes from the outer peripheral portion of the second drive plate 46 toward the radially outside.

—Inner Peripheral Side Torsion Spring—

The inner peripheral side torsion springs 41, for example, six torsion springs 41 are arranged in the circumferential direction. Each of the inner peripheral side torsion springs 41 includes a large coil spring 41a and a small coil spring 41b. The small coil spring 41b is disposed in the large coil spring 41a and is shorter than the large coil spring 41a.

Each of the inner peripheral side torsion springs 41 is disposed in the first and second spring engaging portions 45b, 46a (the window portions) of the drive plate 40, and the third spring engaging portions 42a (window portions described below) of the intermediate plate 42.

The both ends of each of the inner peripheral side torsion springs 41 are supported by the first to third spring engaging portions 45b, 46a, 42a (the window portions) in the circumferential direction. The both sides of each of the inner peripheral side torsion springs 41 are supported by the first to third spring engaging portions 45b, 46a, 42a (the window portions) in the radial direction. Also, the cut-raised parts of the first and second spring engaging portions 45b, 46a prevents each of the inner peripheral side torsion springs 41 from jumping out in the axial direction.

—Intermediate Plate—

The intermediate plate 42 is disposed between the first drive plate 45 and the second drive plate 46. The intermediate plate 42 relatively rotates with respect to the drive plate 40 and the driven plate 44. An outer peripheral portion of the intermediate plate 42 is formed in a substantially tubular shape and includes openings on the turbine side. The fifth spring engaging portions 44b is disposed in each of the openings.

The intermediate plate 42 includes a plurality of third spring engaging portion 42a, a plurality of fourth spring engaging portions 42b, a second rotation restricting portion 42c, and long holes 42d.

Each of the plurality of third spring engaging portion 42a engages with the inner peripheral side torsion springs 41. The plurality of third spring engaging portion 42a are provided on the inner peripheral portions of the intermediate plate 42. Each of the plurality of third spring engaging portion 42a is a window portion which is arranged at predetermined intervals in the circumferential direction. Each of the third spring engaging portions 42a is disposed between the first and second spring engaging portions 45b, 46b so as to be opposed to each of the first and second spring engaging portions 45b, 46b in the axial direction.

Each of the inner peripheral side torsion springs 41 is disposed in each of the third spring engaging portions 42a. Also, a pair of wall portions, opposing to each other in the circumferential direction on each of the third spring engaging portions 42a, engage with each of both ends of the inner peripheral side torsion springs 41.

Each of the plurality of fourth spring engaging portions 42b engages with the outer peripheral side torsion springs 43. The plurality of fourth spring engaging portions 42b are provided on the outer peripheral portions of the intermediate plate 42. The plurality of fourth spring engaging portions 42b are provided on the outer peripheral portions of the intermediate plate 42 at predetermined intervals in the circumferential direction.

Each of the plurality of fourth spring engaging portions 42b engages with each of both ends of the outer peripheral side torsion spring 43. Specifically, each of the plurality of fourth spring engaging portions 42b engages with the outer peripheral side torsion spring 43 on the inner sides and the outer sides of the both ends of each of the outer peripheral side torsion springs 43.

The second rotation restricting portion 42c is provided between the third spring engaging portions 42a and the fourth spring engaging portions 42b in the radial direction to restrict a rotation of the intermediate plate 42 with respect to the driven plate 44. The second rotation restricting portion 42c is a paw portion which protrudes from the middle portion of the intermediate plate 42 toward the radially outside.

Each of the long holes 42d extends in the circumferential direction. The rivet 47, for example, a shaft portion of the rivet 47 is inserted in each of the long holes 42d. In this state, both ends of the rivet 47 are respectively fixed to the first and second drive plates 45, 46. The intermediate plate 42 is attached to the first and second drive plates 45, 46 via the rivets 47 so as to relatively rotate with respect to the first and second drive plates 45, 46.

—Outer Peripheral Side Torsion Spring—

The plurality of outer peripheral side torsion springs 43, for example, four outer peripheral side torsion springs 43 are arranged in the circumferential direction. Also, the plurality of outer peripheral side torsion springs 43 are on an outer side than the clutch portion 28 in a radial direction.

The plurality of outer peripheral side torsion springs 43 are respectively held by the outer peripheral portions of the intermediate plate 42. The plurality of outer peripheral side torsion springs 43 act in series via the intermediate plate 42.

The both ends of each of the outer peripheral side torsion springs 43 are supported by the fourth spring engaging portions 42b in the circumferential direction. Also, each of the outer peripheral side torsion springs 43 is disposed between the fourth spring engaging portions 42b adjacent to each other in the circumferential direction. The outer peripheral portion of the intermediate plate 42 (the tubular portion) prevents each of the outer peripheral side torsion springs 43 from jumping out in the radial direction. Also, the both ends of each of the outer peripheral side torsion springs 43 respectively abut against the fifth spring engaging portions 44b of the driven plate 44 in the circumferential direction.

—Driven Plate—

Figure 4A:
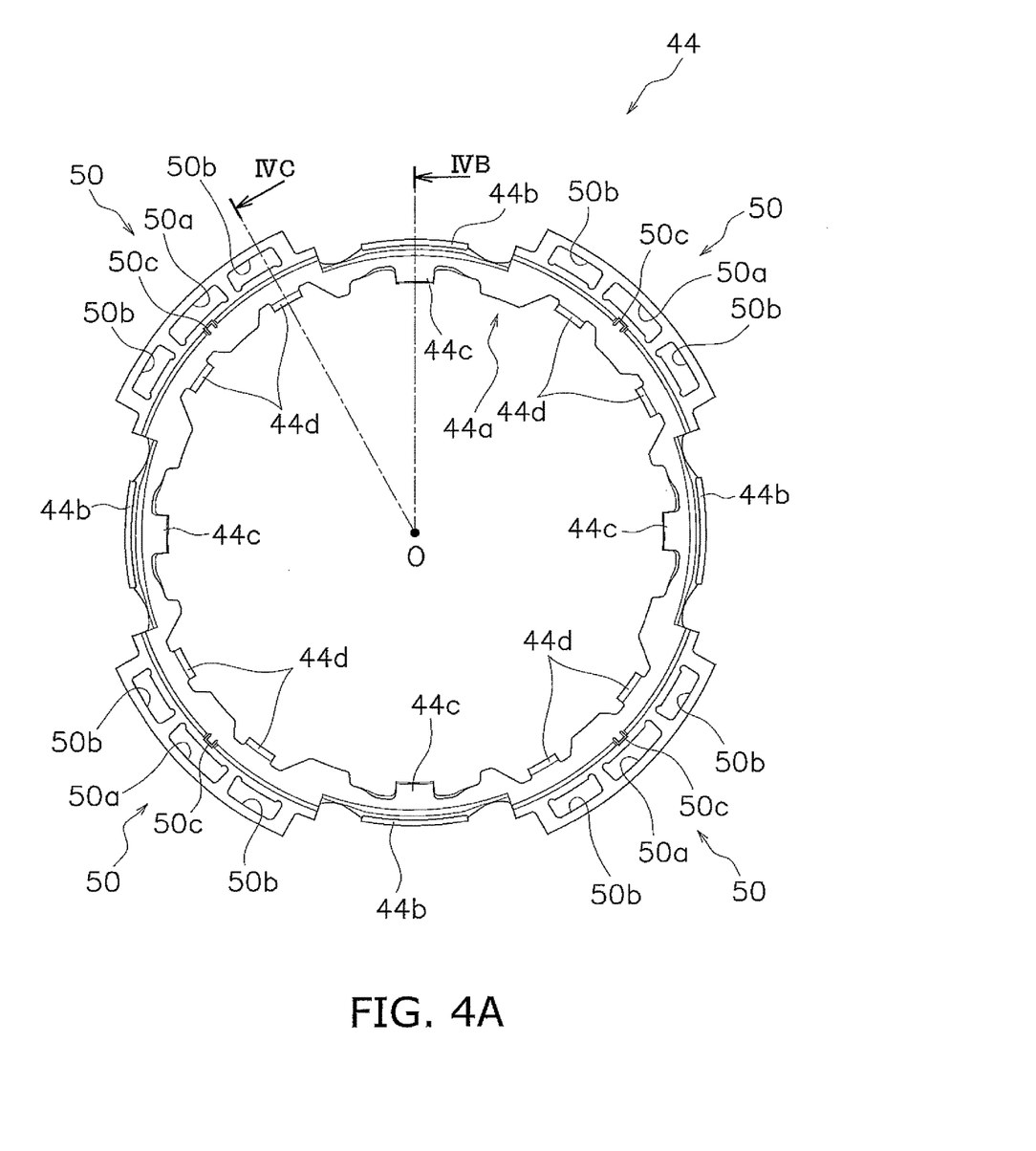
FIG. 4A is a front view of a driven plate.

As shown in FIGS. 3 and 4A, the driven plate 44 is an annular and disc-shaped member. The driven plate 44 relatively rotates with respect to the intermediate plate 42.

Figure 4B:
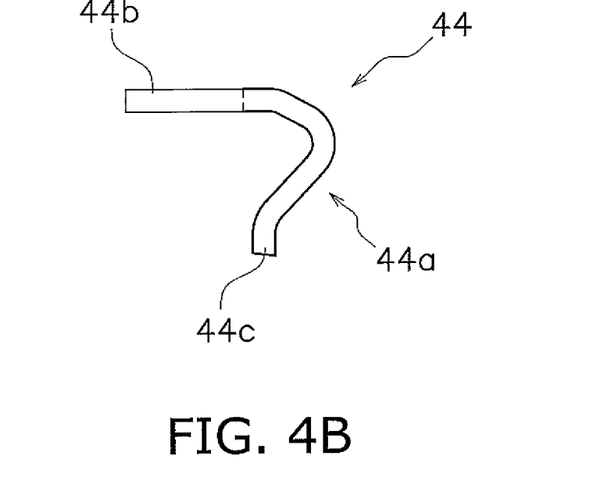
FIG. 4B is a cross sectional view on a cutting line IVB-IVB of FIG. 4A.
Figure 4C:
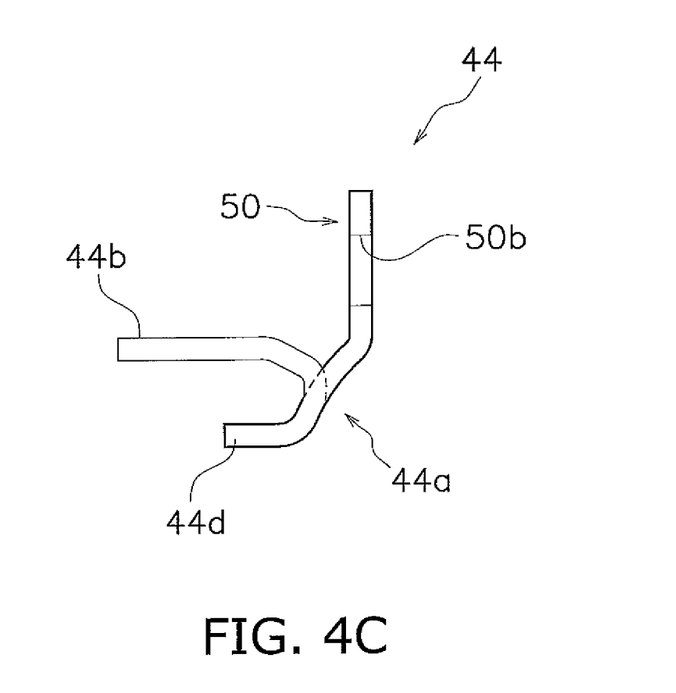
FIG. 4C is a cross sectional view on a cutting line IVC-IVC of FIG. 4A.

As shown in FIGS. 4A and 4B, the driven plate 44 includes main body 44a, the plurality of fifth spring engaging portions 44b, a first locking portion 44c, a second locking portion 44d, and a plurality of damper plate portions 50.

The main body 44a is formed in a substantially annular shape. The main body 44a is fixed to the turbine shell 15. Specifically, the main body 44a is fixed to the turbine shell 15 by a fixing means, for example, welding.

Each of the plurality of the fifth spring engaging portions 44b engages with each of the outer peripheral side torsion springs 43. The plurality of the fifth spring engaging portions 44b is integrally formed on the outer peripheral portion of the main body 44a. Each of the plurality of the fifth spring engaging portions 44b extends from the outer peripheral portion of the main body 44a toward the engine side in the axial direction. Specifically, each of the plurality of the fifth spring engaging portions 44b is formed by bending the outer peripheral portion of the driven plate 44 toward the engine side in the axial direction.

The plurality of fifth spring engaging portions 44b are disposed at predetermined intervals in the circumferential direction. Each of the outer peripheral side torsion springs 43 is disposed between the fifth spring engaging portions 44b adjacent to each other in the circumferential direction. The both ends of each of the outer peripheral side torsion springs 43 respectively engage with the fifth spring engaging portions 44b.

The first locking portion 44c restricts the rotation of the drive plate 40 (the first and second drive plates 45, 46) with respect to the driven plate 44 by abutting against the first rotation restricting portion 46b of the drive plate 40. In other words, the first locking portion 44c functions as a stopper of the drive plate 40.

Specifically, the first locking portion 44c is provided on the inner peripheral portion of the driven plate 44, that is, the inner peripheral portion of the main body 44a. The first locking portion 44c is integrally formed on the inner peripheral portion of the main body 44a so as to protrude from the inner peripheral portion of the main body 44a toward the radially inside. Each of side surfaces of the first locking portion 44c abuts against the first rotation restricting portion 46b in the circumferential direction.

The second locking portion 44d restricts the rotation of the intermediate plate 42 with respect to the driven plate 44 by abutting against the second rotation restricting portion 42c of the intermediate plate 42. In other words, the second locking portion 44d functions as a stopper of the intermediate plate 42.

Specifically, the second locking portion 44d is provided on the inner peripheral portion of the driven plate 44, that is, the inner peripheral portion of the main body 44a. The second locking portion 44d extends from the inner peripheral portion of the main body 44a toward the engine side in the axial direction.

For example, the second locking portion 44d is a paw portion which is formed by partially bending the inner peripheral portion of the driven plate 44 toward the engine side in the axial direction. Each of side surfaces of the second locking portion 44d, that is, each of side surfaces of the paw portion abuts against the second rotation restricting portion 42c in the circumferential direction.

The damper plate portions 50 are integrally formed on the outer peripheral portion of the main body 44a. Each of the damper plate portions 50 extends from the outer peripheral portion of the main body 44a toward the radially outside. Also, the damper plate portions 50 are included in the dynamic damper device 30. A detail configuration of the damper plate portions 50 are explained on the configuration of the dynamic damper device 30 as described below.

<Dynamic Damper Device>

The dynamic damper device 30 is configured to absorb vibration transmitted from the driven plate 44 to the turbine shell 15. As shown in FIG. 3, the dynamic damper device 30 includes the plurality of damper plate portions 50 (e.g. four damper plate portions 50; an example of a second output portion), a pair of inertia rings 51 (an example of an inertia portion), a pair of lid members 52, a plurality of coil springs 53 (e.g. four coil springs 53; an example of a third elastic portion), and a plurality of stop pins 54 (e.g. eight stop pins 54).

As shown in FIGS. 3 and 4A, the damper plate portions 50 are included in the driven plate 44 and are integrally formed on the main body 44a of the driven plate 44. Each of the damper plate portions 50 is a portion which extending from the outer peripheral portion of the main body 44a of the driven plate 44 toward the radially outside.

As shown in FIG. 4A, each of the damper plate portions includes a first spring storage portion 50a. The first spring storage portion 50a is provided on each of the damper plate portions 50 with a predetermined length in the circumferential direction.

Each of a plurality of long holes 50b is formed on the both side of each of the first spring storage portions 50a in the circumferential direction. Each of the long holes 50b is arranged at a predetermined length in the circumferential direction. Also, a plurality of supporting portions 50c are formed on the radially inside of the first spring storage portions 50a. Each of the supporting portions 50c is formed by cutting and raising a part of each of the damper plate portions 50 toward the front cover 2 side.

As shown in FIG. 3, the pair of inertia rings 51 are disposed on the both side of the damper plate portions 50 in the axial direction. One of the pair of inertia rings 51 is the substantially same configuration as the other of the pair of inertia rings 51.

Figure 5:
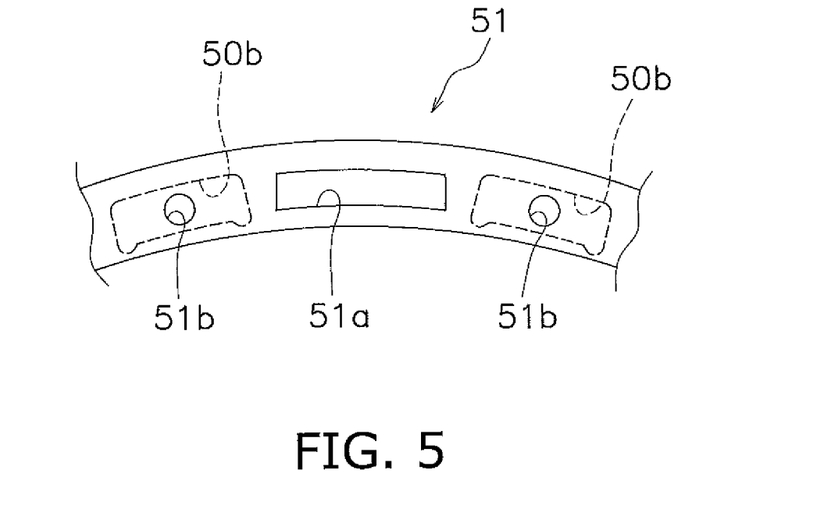
FIG. 5 is a partial front view of an inertia ring of the dynamic damper device.

As shown in FIG. 5, each of the inertia rings 51 includes a plurality of second spring storage portions 51a. The plurality of second spring storage portions 51a are provide on each of the inertia rings 51 at predetermined intervals in the circumferential direction. The plurality of second spring storage portions 51a is formed at a position corresponding to the first spring storage portions 50a of each of the damper plate portions 50. Also, a plurality of first through holes 51b are formed on each of the inertia rings 51. Specifically, each of the plurality of first through holes 51b is formed at a position corresponding to a center position in the circumferential direction inside each of the long holes 50b of the damper plate portion 50.

As shown in FIG. 3, the pair of lid members 52 are disposed on the outer side of the pair of inertia rings 51 in the axial direction. Specifically, one of the lid members 52 is arranged closer to the front cover 2 than the inertia ring 51 disposed on the front cover 2 side. The other of the lid members 52 is arranged closer to the turbine 4 than the inertia ring 51 disposed on the turbine 4 side.

Figure 6:
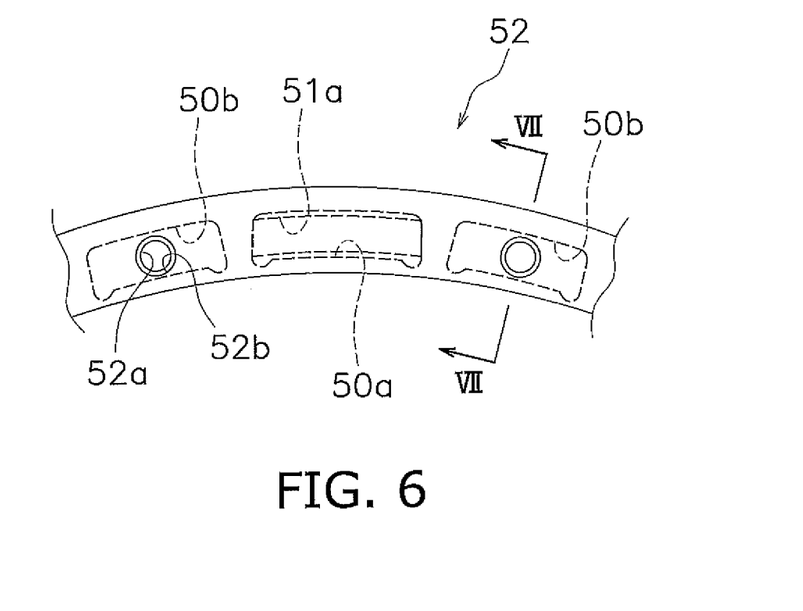
FIG. 6 is a partial front view of a lid member of the dynamic damper device.
Figure 7:
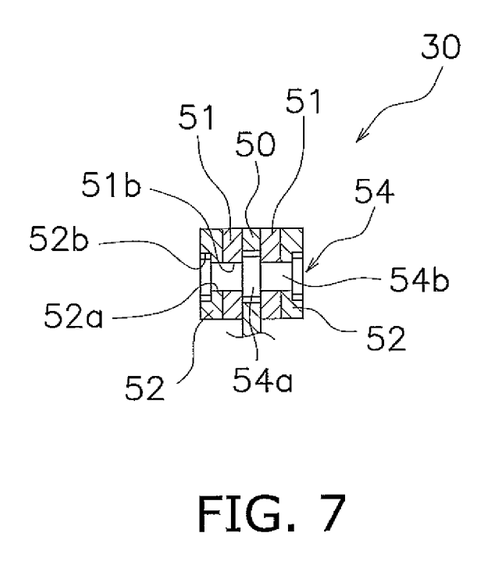
FIG. 7 is a cross sectional view on a cutting line VII-VII of FIG. 6.

As shown in FIGS. 6 and 7, each of the pair of lid members 52 is formed in a substantially annular shape and is the same inner and outer diameters as the inertia rings 51. Also, a plurality of second through holes 52a are formed on each of the pair of lid members 52. Specifically, each of the plurality of second through holes 52a is formed at a position corresponding to each of the first through holes 51b of the inertia ring 51. A recess portion 52b, which includes a diameter larger than a diameter of each of the second through holes 52a, is provided on an end portion on axially outer side of each of the second through holes 52a.

Each of the plurality of coil springs 53 is disposed in each of the first spring storage portions 50a of the damper plate portions 50 and each of the second spring storage portions 51a of the inertia rings 51. Both ends of each of the coil springs 53 respectively abut against wall portions of the first spring storage portion 50a and the second spring storage portions 51a in the circumferential direction.

As shown in FIG. 7, each of the plurality of stop pins 54 includes a large-diameter shaft portion 54a and small-diameter shaft portions 54b. The large-diameter shaft portion 54a is provided on a center portion of the stop pin 54 in an axial direction of the stop pin 54. The large-diameter shaft portion 54a includes a diameter larger than a diameter of each of the first through holes 51b of the inertia ring 51 and smaller than a diameter (a radially distance) of each of the long holes 50b of the damper plate portion 50.

The small-diameter shaft portions 54b are respectively provided on the axially both side of the large-diameter shaft portion 54a. Each of the small-diameter shaft portions 54b is inserted into each of the first through holes 51b of the inertia ring 51 and each of the second through holes 52a of the lid member 52. The inertia rings 51 and the lid members 52 are fixed on the axially both sides of the damper plate portions 50 by fastening a head portion of the small-diameter shaft portion 54b.

By the above configuration, the pair of the inertia rings 51 and the pair of the lid members 52 relatively rotate with respect to the damper plate portions 50, in a range that the stop pin 54 is movable in each of the long holes 50b of the damper plate portion 50. If the large-diameter shaft portion 54a of the stop pin 54 abuts against wall portion of each of the long holes 50b, this abutment prohibits the inertia rings 51 and the lid members 52 from relatively rotating with respect to the damper plate portions 50.

Also, in the state that the inertia rings 51 and the lid members 52 are fixed to each other, the inner peripheral surface of the inertia ring 51 abuts on the supporting portions 50c. In other words, the inertia rings 51, the lid members 52, and the coil springs 53 is positioned in the radial direction by the supporting portions 50c.

[Operation of the Torque Converter]

Firstly, operation of the torque converter 1 will be described below.

In the state that the front cover 2 and the impeller 3 rotate as a unit, the operating oil flows from the impeller 3 to the turbine 4 and torque is transmitted from the impeller 3 to the turbine 4 via the operating oil. The torque transmitted from the turbine 4 is transmitted to the input shaft of the transmission via the turbine hub 17.

When speed ratio of the torque converter 1 raises and rotation speed of the input shaft reach a predetermined speed, the operating oil of the first oil chamber S1 is discharged therefrom via the first oil path 34a, and the operating oil is supplied to the second oil chamber S2 via the second oil path 34b and the oil reservoir portion 35. Then, the piston 32 moves on the front cover 2 side. As a result, the pressing portion 32a of the piston 32 presses the clutch plates 31 on the front cover 2 side. This state is a clutch-on state of the clutch portion 28.

In the above clutch-on state, torque is transmitted from the front cover 2 to the torque converter body 6 via the lock-up device 7. Specifically, the torque inputted to the front cover 2 is transmitted along a route and outputted to the turbine hub 17. The route transmitting the torque is "the clutch plates 31→the drive plate 40→the inner peripheral side torsion springs 41 (the large coil spring 41a and the small coil spring 41b)→the intermediate plate 42→the outer peripheral side torsion springs 43→the driven plate 44".

The lock-up device 7 of the clutch-on state not only transmits the torque as above stated but also damps torque fluctuation inputted from the front cover 2. Specifically, when torsional vibration is generated on the lock-up device 7, the inner peripheral side torsion springs 41 and the outer peripheral side torsion springs 43 are compressed in series between the drive plate 40 and the driven plate 44. The torque fluctuation caused by the torsional vibration is damped by this operation of the inner and outer peripheral side torsion springs 41, 43.

In case that the clutch portion 28 is set to a clutch-off state, the operating oil of the second oil chamber S2 is discharged therefrom via the second oil path 34b and the oil reservoir portion 35, and the operating oil is supplied to the first oil chamber S1 via the first oil path 34a. Then, the piston 32 moves on the turbine 4 side. As a result, the pressure of the pressing portion 32a of the piston 32 with respect to the clutch plates 31 is released. This state is a clutch-off state of the clutch portion 28.

[Torsional Characteristic]

Figure 8:
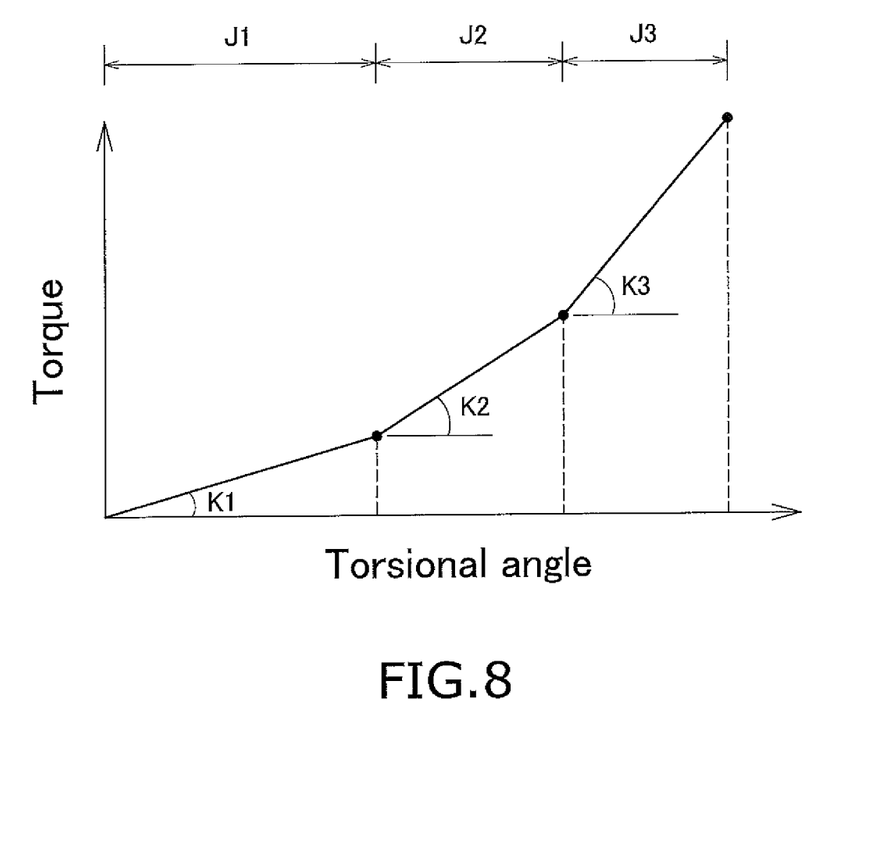
FIG. 8 is a characteristic diagram indicating relationship between a torsional angle and torque.

Secondary, the torsional characteristic will be described by seeing FIG. 8.

When one of the drive plate 40 and the driven plate 44 relatively rotates with respect to the other of the drive plate 40 and the driven plate 44 and a torsional angle generates between the drive plate 40 and the driven plate 44, the large coil springs 41a of the inner peripheral side torsion springs 41 and the outer peripheral side torsion springs 43 are compressed in series. In this state, the torsional characteristic includes a first torsional rigidity K1. A sign "J1" in FIG.

8 indicates a range that the relationship between the torsional angle and the torque is defined by the first torsional rigidity K1.

When the torsional angle is larger than one of the above state, the small coil springs 41b of the inner peripheral side torsion springs 41, which are shorter than the large coil springs 41a, are compressed with the large coil springs 41a. In other words, the large and small coil springs 41a, 41b of the inner peripheral side torsion springs 41 and the outer peripheral side torsion springs 43 are compressed in series between the drive plate 40 and the driven plate 44 via the intermediate plate 42. In this state, the torsional characteristic includes a second torsional rigidity K2.

When the second rotation restricting portion 42c abuts against the second locking portion 44d, the operation of the outer peripheral side torsion springs 43 is stopped. A sign "J2" in FIG. 8 indicates a range that the relationship between the torsional angle and the torque is defined by the second torsional rigidity K2.

When the torsional angle further increases, the large and small coil springs 41a, 41b of the inner peripheral side torsion springs 41 are compressed between the drive plate 40 and the intermediate plate 42. In this state, the torsional characteristic includes a third torsional rigidity K3. A sign "J3" in FIG. 8 indicates a range that the relationship between the torsional angle and the torque is defined by the third torsional rigidity K3. Finally, when the first rotation restricting portion 46b abuts against the first locking portion 44c, the operation of the large and small coil springs 41a, 41b of the inner peripheral side torsion springs 41 is stopped. Thus, the torsional characteristic of the lock-up device 7 includes the first to third torsional rigidities K1, K2, K3.

[Operation of the Dynamic Damper Device]

The torque transmitted to the driven plate 44 on the route as described above is transmitted to a transmission side member via the turbine hub 17. Then, a rotation speed variation from the engine can be effectively reduced by the dynamic damper device 30, because the dynamic damper device 30 is provided on the driven plate 44.

For example, the inertia rings 51 and the lid members 52 relatively rotates with respect to the damper plate portions 50 of the dynamic damper device 30 with a phase shift by the action of the coil springs 53.

Specifically, the rotation of the inertia rings 51 and the lid members 52 delay to the rotation of the damper plate portions 50 because of the action of the coil springs 53. This phase shift enable the rotation speed variation to be reduced.

Figure 9:
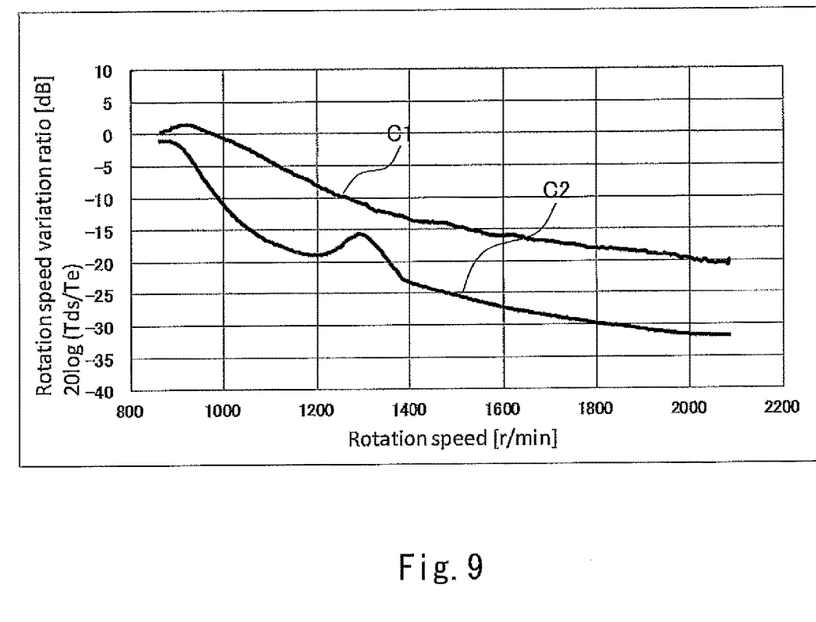
FIG. 9 is a characteristic diagram indicating relationship between an engine rotation speed and a rotation speed variation.

The characteristic C1 in FIG. 9 indicates a rotation speed variation of the conventional lock-up device which doesn't include the dynamic damper device 30. The characteristic C2 indicates the rotation speed variation of the lock-up device 7 which includes the dynamic damper device 30.

In comparison the characteristic C2 with the characteristic C1 in FIG. 9, the rotation speed variation of the lock-up device 7 including the characteristic C2 can be reduced more effectively than the conventional lock-up device

[Features]

(1) The lock-up device 7 is disposed between a front cover 2 coupled to an engine-side member and a torque converter body 6. The lock-up device 7 is configured to reduce a vibration transmitted from the front cover 2 to the torque converter body 6.

The lock-up device 7 includes a damper portion 29 and a dynamic damper device 30. The damper portion 29 is configured to damp vibration inputted from the front cover 2. The damper portion 29 includes a driven plate 44 couple to a turbine shell 15 of the torque converter body 6 on a radially outside. The dynamic damper device 30 is configured to absorb vibration transmitted from the driven plate 44 to the turbine shell 15.

The dynamic damper device 30 includes at least one of damper plate portion 50 and at least one of inertia ring 51. The damper plate portion 50 is couple to the turbine shell 15 on a radially outside. The inertia ring 51 is relatively movable with respect to the damper plate portion 50.

In the lock-up device 7, the driven plate 44 and the damper plate portion 50 are coupled to the turbine shell 15 of the torque converter body 6 on a radially outside. Herewith, the lock-up device 7 is capable of reducing in the size thereof in an axial direction, because there was no need of preparing space for coupling the damper plate portion 50 to the turbine shell 15 of the torque converter body 6 on a radially inside in the axial direction such as the conventional lock-up device.

(2) A lock-up device 7 is preferably configured so that the driven plate 44 is fixed to the turbine shell 15.

In this case, the lock-up device 7 is capable of reliably transmitting power of the damper portion 29 to the turbine shell 15 of the torque converter body 6.

(3) A lock-up device 7 is preferably configured so that the damper plate portion 50 is fixed to the turbine shell 15.

In this case, the lock-up device 7 is capable of reliably reducing vibration, which is transmitted from the damper portion 29 to the turbine shell 15 of the torque converter body 6, with the dynamic damper device 30.

(4) A lock-up device 7 is preferably configured so that the driven plate 44 and the damper plate portion 50 are formed integrally with each other.

In this case, the lock-up device 7 is capable of reducing vibration, which is outputted from the driven plate 44 to the turbine shell 15 of the torque converter body 6, with the dynamic damper device 30. Also, the lock-up device 7 is capable of reducing the number of parts thereof, because the driven plate 44 and the damper plate portion 50 are formed as a unitary member.

(5) A lock-up device 7 is preferably configured so that the driven plate 44 is formed separately from the damper plate portion 50.

In this case, the lock-up device 7 is capable of reducing vibration, which is outputted from the driven plate 44 to the turbine shell 15 of the torque converter body 6, with the dynamic damper device 30.

(6) A lock-up device 7 is preferably configured so that the driven plate 44 and the damper plate portion 50 is arranged in a circumferential direction.

In this case, the lock-up device 7 is capable of effectively reducing vibration generated in the circumferential direction, which is outputted from the driven plate 44 to the turbine shell 15 of the torque converter body 6, with the dynamic damper device 30.

(7) A lock-up device 7 is preferably configured so that the inertia ring 51 of the dynamic damper device 30 is disposed on an outer side than the turbine shell 15 in a radial direction.

In this case, the lock-up device 7 is capable of reducing in the size thereof in an axial direction.

(8) A lock-up device 7 is preferably configured so that the damper portion 29 includes at least one of inner peripheral side torsion spring 41 and at least one of outer peripheral side torsion spring 43. The outer peripheral side torsion spring 43 is disposed on an outer side than the inner peripheral side torsion spring 41 in a radial direction and arranged in series with the inner peripheral side torsion spring 41. The driven plate 44 is engaged with the outer peripheral side torsion spring 43 and is coupled to the turbine shell 15.

In this case, power of the engine is transmitted from the inner peripheral side torsion spring 41 on the radially inside to the outer peripheral side torsion spring 43 on the radially outside. And the power is transmitted from the driven plate 44 engaged with the outer peripheral side torsion spring 43 to the turbine shell 15 of the torque converter body 6. Thus, the lock-up device 7 is capable of simply forming a configuration thereof and a power transmission route thereof.

(9) A lock-up device 7 further includes a clutch portion 28. The outer peripheral side torsion spring 43 is disposed on an outer side than the clutch portion 28 in a radial direction.

The lock-up device 7 is capable of reducing in the size thereof in an axial direction, even if the lock-up device 7 is configured as described above.

(10) A lock-up device 7 further includes a clutch portion 28. The clutch portion 28 is a multi disc clutch.

In this case, the lock-up device 7 is capable of reliably transmitting the power of the engine to the damper portion 29.

(11) A lock-up device 7 is preferably configured so that the dynamic damper device 30 includes the damper plate portion 50, the inertia ring 51, and at least one of coil spring 53. The damper plate portion 50 is integrally rotatable with the driven plate 44. The inertia ring 51 is relatively rotatable with respect to the damper plate portion 50. The coil spring 53 elastically couples the damper plate portion 50 and the inertia ring 51.

In this case, the lock-up device 7 is capable of effectively reducing rotational vibration within a predetermined range, which is transmitted from the driven plate 44 to the turbine shell 15 of the torque converter body 6.

OTHER EMBODIMENT

The preferred embodiments of the present disclosure have been described above. However, specific constructions are not limited to those described in the aforementioned preferred embodiments, and a variety of changes can be made without departing from the scope of the present disclosure.

(A) In the above embodiment, explanation is performed as an example that the damper plate portions 50 are included in the driven plate 44. Specifically, the damper plate portions 50 are integrally formed on the driven plate 44.

Figure 10:
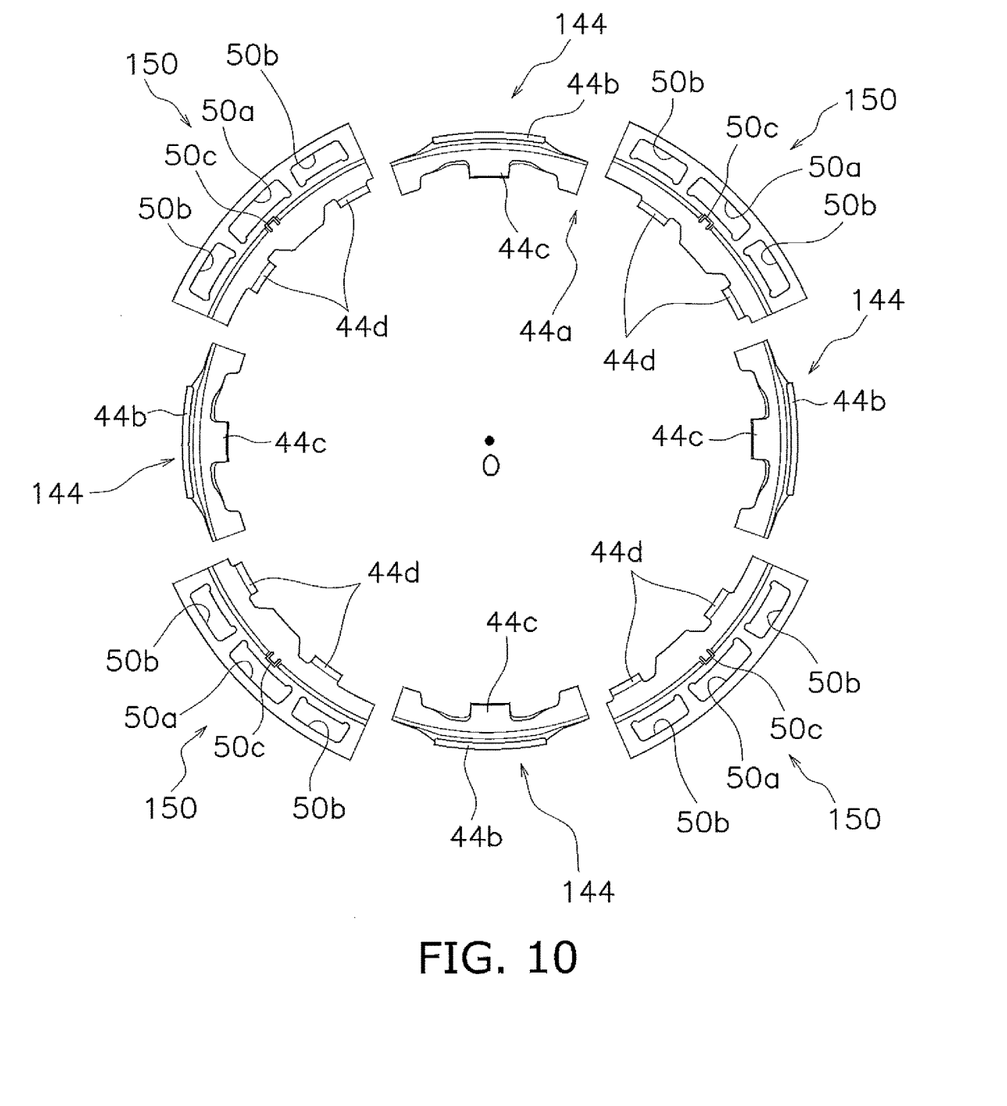
FIG. 10 is a front view of a driven plate and a damper plate portion according to the other embodiment of the present disclosure.

Instead of this, as shown in FIG. 10, a plurality of damper plate portions 150 may be formed separately from a plurality of driven plates 144.

In this case, each of the plurality of damper plate portions 150 and each of the plurality of the driven plates 144 is fixed to the turbine 4, for example, the turbine shell 15.

Each of the damper plate portions 150 and each of the driven plates 144 are arranged in the circumferential direction. Specifically, each of the damper plate portions 150 is disposed between the driven plates 144 adjacent to each other in the circumferential direction. In this state, each of the damper plate portions 150 and each of the driven plates 144 are fixed on the turbine shell 15 by a fixing means, for example, welding.

The configuration of the other embodiment (A) is the same as that of the aforementioned embodiment, except for the configuration that the damper plate portions 150 are formed separately from the driven plates 144. Thus, the same signs is indicated on FIG. 10 about the same configuration as the aforementioned embodiment (B) In the above embodiment, explanation is performed as an example that the dynamic damper device 30 includes damper plate portions 50, 150, the pair of inertia rings 51, the pair of lid members 52, the plurality of coil springs 53, and the stop pins 54.

However, the configuration of the dynamic damper device 30 is not limited to the configuration of the aforementioned embodiment. The dynamic damper device 30 may be comprised of the other configuration which is capable of reducing the rotation speed variation.

(C) In the above embodiment, explanation is performed as an example that one of the pair of inertia rings 51 is the substantially same configuration as the other of the pair of inertia rings 51. Instead of this, the configuration of one of the pair of inertia rings 51 may be different from that of the other of the pair of inertia rings 51.

What is claimed is:

1. A vibration reduction device disposed between a front cover coupled to an engine-side member and a torque converter body, the vibration reduction device configured to reduce vibration transmitted from the front cover to the torque converter body, the vibration reduction device comprising:
a damper portion configured to damp vibration inputted from the front cover and including a first output portion coupled to a radially outer portion of an output side member of the torque converter body; and
a dynamic vibration absorbing device configured to absorb vibration transmitted from the first output portion to the output side member, and including a second output portion coupled to the radially outer portion of the output side member and an inertia portion relatively movable with respect to the second output portion.

2. The vibration reduction device according to claim 1, wherein the first output portion is fixed to the output side member.

3. The vibration reduction device according to claim 1, wherein the second output portion is fixed to the output side member.

4. The vibration reduction device according to claim 1, wherein the first output portion and the second output portion are formed integrally with each other.

5. The vibration reduction device according to claim 1, wherein the first output portion is formed separately from the second output portion.

6. The vibration reduction device according to claim 5, wherein the first output portion and the second output portion are arranged in a circumferential direction.

7. The vibration reduction device according to claim 1, wherein the inertia portion of the dynamic vibration absorbing device is disposed on a more outer side than the output side member in a radial direction.

8. The vibration reduction device according to claim 1, wherein
the damper portion includes a first elastic portion and a second elastic portion, the second elastic portion disposed on a more outer side than the first elastic portion in a radial direction and arranged in series with the first elastic portion; and
the first output portion is engaged with the second elastic portion and is coupled to the output side member.

9. The vibration reduction device according to claim 8, further comprising:
a clutch portion; wherein the second elastic portion is disposed on a more outer side than the clutch portion in a radial direction.

10. The vibration reduction device according to claim 1, further comprising:
   a clutch portion; wherein the clutch portion is a multi disc clutch.

11. The vibration reduction device according to claim 1, wherein
   the dynamic vibration absorbing device includes the second output portion, the inertia portion, and a third elastic portion, the second output portion integrally rotatable with the first output portion, the inertia portion relatively rotatable with respect to the second output portion, the third elastic portion elastically coupling the second output portion and the inertia portion.

* * * * *